E. HOPKINSON.
APPARATUS FOR MANUFACTURING PNEUMATIC TIRES FOR VEHICLES.
APPLICATION FILED AUG. 15, 1918.
1,317,657.
Patented Sept. 30, 1919.
2 SHEETS—SHEET 1.
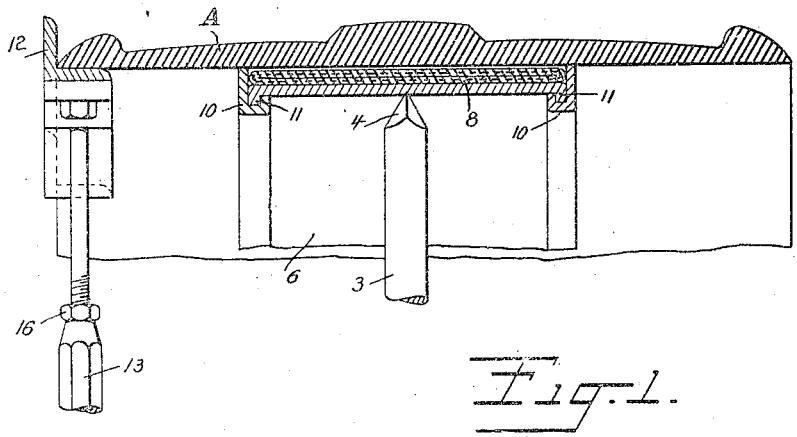
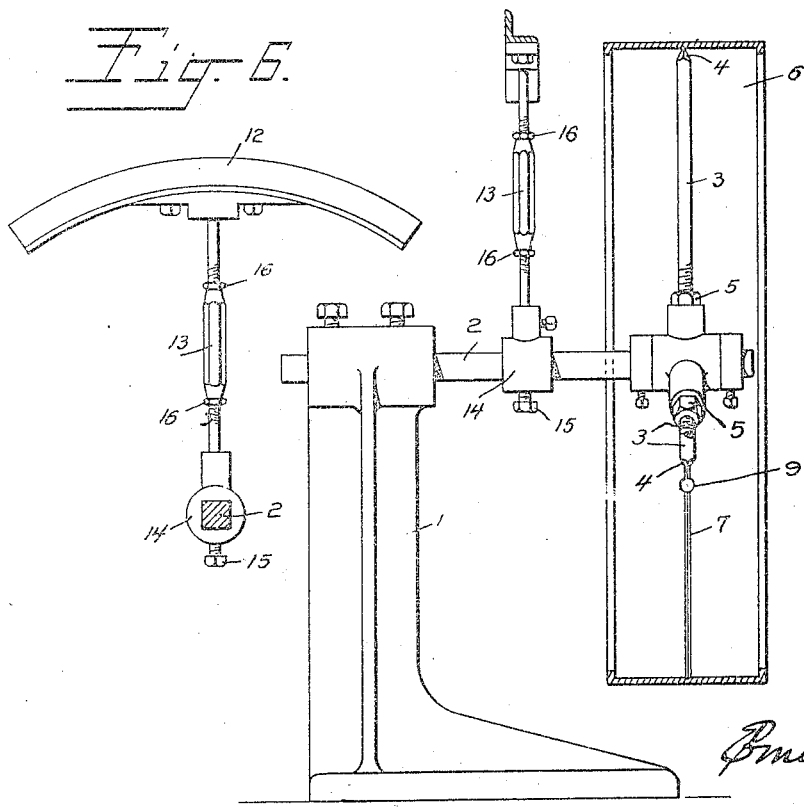

E. HOPKINSON.
APPARATUS FOR MANUFACTURING PNEUMATIC TIRES FOR VEHICLES.
APPLICATION FILED AUG. 15, 1918.

1,317,657.

Patented Sept. 30, 1919.
2 SHEETS—SHEET 2.

Inventor
Ernest Hopkinson

UNITED STATES PATENT OFFICE.

ERNEST HOPKINSON, OF NEW YORK, N. Y.

APPARATUS FOR MANUFACTURING PNEUMATIC TIRES FOR VEHICLES.

1,317,657.   Specification of Letters Patent.   Patented Sept. 30, 1919.

Application filed August 15, 1918. Serial No. 249,935.

*To all whom it may concern:*

Be it known that I, ERNEST HOPKINSON, a citizen of the United States, and a resident of New York city, county and State of New York, have invented certain new and useful Improvements in Apparatus for Manufacturing Pneumatic Tires for Vehicles, of which the following is a full, clear and exact description.

This invention relates to apparatus for building tires and more particularly to apparatus for imparting the desired shape to the assembled components of a tire casing.

The principal object of the invention is to provide an apparatus for the distending of the central portion of the band and the moving of the edge portions thereof toward each other.

With this and other objects in view, which will readily appear as the nature of the invention is better understood, the same consists in the novel construction, combination, and arrangement of parts hereinafter more fully described, illustrated and claimed.

Referring to the drawings forming a part of this specification in which similar characters of reference designate like parts throughout, Figure 1 is a front view partly in elevation and partly in section of a preferred form of my invention with certain parts removed;

Fig. 2 is an enlarged fragmental view of Fig. 1 including some of the parts not shown in Fig. 1 and showing a form of pulley band structure supported thereby;

Fig. 6 is a view of the gage for positioning the casing shown in Fig. 2 and taken at right angles thereto.

Figure 3:
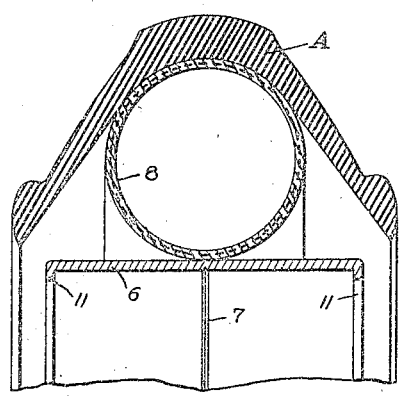
Fig. 3 is a view in part of Fig. 2 showing the central portion of the band distended and the edges moved toward each other.

The pulley band indicated at A, Fig. 2 may be of any desired construction and may include an assemblage of all of the parts of the casing or of any portion thereof such, for example, as the carcass of the casing. In the present instance for convenience of illustration a complete casing is shown in outline built in the form of a flat pulley band. This may be done in any desired manner and by the use of any desired apparatus, but as this forms no part of the present invention no further description of this feature is deemed necessary.

A preferred embodiment of the present invention comprises a support 1 to which is secured a horizontal shaft 2 upon the outer end of which are revolubly mounted three arms 3 tapered at their upper ends as shown at 4. The arms are provided with means for extending and retracting them to accommodate cylinders of various diameters. The arms having been adjusted for a particular size cylinder it is only necessary in removing the cylinder to retract one of the arms, the other arms remaining permanently fixed. In the present instance the arms are made adjustable by forming them in sections, one section screwing into the other as shown, and lock nuts 5 are provided for securing the arms in their desired adjusted positions.

A hollow cylinder 6 is supported in position on the arms 3. This cylinder is of less diameter than the tire casing so as to leave an appreciable clearance between its surface and the edges of the casing in order that the edges of the casing may be free during the forming process, and to provide space for the deflated tube as will later appear. It is provided on its interior wall with a centrally disposed longitudinal V-shaped groove 7 for engagement with the tapered ends of the arms 3. This construction permits the cylinder to be easily removed from the arms and another one mounted thereon, and the circumferential groove 7 further enables the cylinder to be easily and accurately supported in vertical position, and at the proper distance from the side gage as will later more fully appear. This construction further enables the cylinder to be supported by the arms from any points in the groove 7 that may happen to be brought into engagement therewith. An apparatus having these features is of considerable importance for the cylinder 6 is intended for supporting the tire casing when it has been shaped and removed to other apparatus for subsequent treatment, and it is therefore desirable that simple and ready means be provided to facilitate the removal of the cylinder from the arms 3 and the placing thereon of another cylinder which must be done for each tire that is built.

Figure 4:
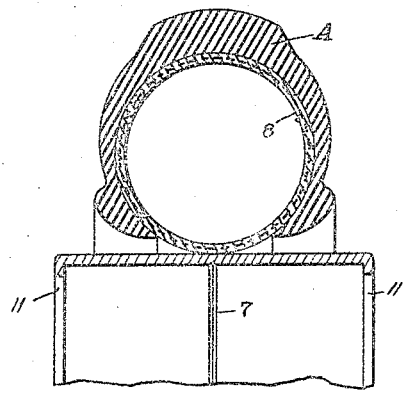
Fig. 4 is a view similar to Fig. 3 showing the sides of the casing brought into contact with the inflated tube.
Figure 5:
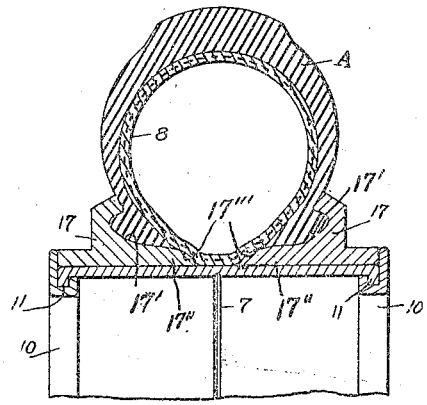
Fig. 5 is a view similar to Fig. 4 but showing the side flanges in place and the edges of the casing in their final positions.

An inflatable tube 8 is supported on the cylinder 6 and is preferably of an interior diameter substantially equal to that of the supporting cylinder, so that it will closely fit thereupon. My invention when viewed broadly is not restricted to any particular type of tube but for reasons that will presently appear is preferably composed of vulcanized rubber reinforced with fabric, the latter serving to restrict the tube when inflated to a predetermined size and shape as shown in Figs. 3 to 5. Or if desired the bag may be made entirely of rubber, and a suitable rubber compound may be chosen and the rubber wall suitably thickened at the desired parts to serve in place of the fabric reinforcement.

When the tube as thus constructed is expanded it will somewhat resemble the usual type of rigid core, and will accordingly impart definite size to the casing without the necessity of outer confining means such as an outer tread band or mold walls which are usually necessary where a freely elastic rubber tube is employed. The tube is provided with the usual valve for inflating and deflating it, which may conveniently pass through an orifice formed in the cylinder 6 as shown at 9.

While the cylinder 6 may be of any suitable width desired I have found in practice that it need be no wider than approximately the width of the tube when deflated and flattened, and in my preferred embodiment as shown in Fig. 2 I have constructed the cylinder of substantially the same width as the flattened tube, and to insure a ready means of definitely positioning the bag upon the cylinder I have provided the side rings 10 which when in position at the commencement of the forming process make a channel for the inflating tube. Although one ring will answer the purpose of positioning the tube, I have shown two as these rings are also used for a further purpose as will presently appear. The rings are made detachable from the cylinder and in the present instance are in the form of split rings U-shaped in cross-section thereby adapting them to engage downwardly projecting flanges 11 formed at the edges of the cylinder, the outer parts of the rings being the longer for enabling them to extend beyond the cylinder to form a channel for the inflating tube and also to constitute locking means for the side flanges 17 hereafter described.

A gage 12 is provided for centralizing the pulley band structure upon the tube and is preferably L-shape in cross-section to provide a shoulder in which an edge of the pulley band may rest. The gage which is also curved to correspond substantially to the curvature of the band, may be of any desired length, and while I have found that a single gage will suffice to centralize the band two or more may be employed if desired. The gage 12 is mounted on the upper end of a vertical arm 13 which is secured at its lower end to a hub 14 mounted to slide longitudinally on the shaft 2 to enable the gage to be set for different widths of bands, and a lock nut 15 is provided for securing the hub in adjusted position. The arm 13 is made longitudinally adjustable by forming it of sections having respectively right and left handed threads which screw into a central section whereby the turning of the central section will operate to raise or lower the gage as desired to adjust it for bands of different diameters as clearly shown in Figs. 1 and 2. Lock nuts 16 are provided for securing the sections in the desired adjusted positions.

The pulley band having been built to the desired degree of completion is mounted upon the support including the cylinder 6, deflated tube 8, and rings 10. The pulley band after it has been mounted on the cylinder is moved laterally relative to the tube until its edge rests in the shoulder formed by the vertical and horizontal portions of the gage 12, which centrally locates the band upon the tube and cylinder, the gage, of course, having been first adjusted to accord with the size of casing being built. It is desirable that the outer portions of the rings 10 stand for a convenient distance beyond the flattened tube so that the band when being centralized will move freely over the tube and there should also be a sufficient amount of clearance between the rings 10 and band to permit free lateral movement of the latter. When the band is thus centralized the tube is then inflated by connecting the valve thereof with a source of fluid supply or pump (not shown). The band, by this operation, is simultaneously distended along its central portion while the edges are moved toward each other as shown in Fig. 3. When the shaping of the band has progressed to the desired extent in this manner the bag is held in its inflated state, the rings 10 are removed, and the sides of the casing are moved further together until they come into contact with the inflated tube and the casing assumes the position shown in Fig. 4. This may be accomplished by hand or by the use of any desired instrumentality, as for instance by the use of a tool resembling a tire stitching tool, the cylinder 6 being revolved during this period.

A pair of annular side flanges 17 are then mounted upon the cylinder. The flanges are preferably formed with oppositely disposed inner walls 17' corresponding in contour to the exterior walls of the edge portions of the finished casing, and preferably have a base portion 17″ which rests upon the cylinder and fills the space between the edges of the casing and cylinder when the edges are in their final positions as shown in Fig. 5. The base portions of the flanges are preferably tapered at their inner edges 17‴ to better enable them to pass between the edges of the casing and cylinder when first placed in position. The flanges as they are moved inwardly engage the edges of the casing and force them into their final positions as shown in Fig. 5, the side walls being thus brought with any desired amount of pressure into engagement with the side walls of the inflated tube. The split rings 10 are then replaced upon the cylinder 6, the outer portions serving to secure the flanges 17 against outward movement, which in this position coöperate with the cylinder 6 to form a channel for supporting the casing as thus brought to tire shape.

The tube, if desired, need not be entirely inflated until after the flanges have been secured in place, and outer confining means such as mold walls may also be used if desired to support the casing exteriorly and the tube may be inflated to full size either before or after the introduction of the mold section. In fact I prefer to partially deflate the tube (from the position shown in Fig. 4) before the flanges are placed in position. This will relieve the edges of the casing of any slight stretch they may have been subjected to, and place them in position to be engaged by the flanges 17 as they are moved to their final position; after which the tube may be inflated to the degree desired.

It will be understood that after the pulley band has been subjected to the shaping action of the apparatus forming the present invention it may be subjected to further treatments in connection with other apparatus for giving final formation and vulcanization thereto. Also where only a part of the components are assembled for treatment by the present apparatus such for instance as the carcass, the remaining parts such as the breaker strip, cushion stock, tread, etc., may be added after the casing has been inflated in the manner already described.

It will be seen that my invention contemplates a cylindrical support for the tube both when deflated and inflated. When inflated the central portion of the cylinder serves as the support, and the edge portions provide supports for the two edges of the casing, which portions being preferably integral with the central portion are fixed against relative movement in their respective planes so that positive and accurate alinement of the edges of the casing is assured when they are brought to their final positions. The side flanges which are provided for retaining the edges of the casing against outward movement are restricted by the cylinder to an outward and inward movement thereby always maintaining perfect alinement with each other. They are moreover provided with the tapered inwardly extending projections which are of material assistance in forcing the flanges between the cylinder and tire edges, thereby gradually stretching the edges until they are engaged by the suitably shaped bead cavities formed in the flanges. The flanges are then forced to their final positions and the tube inflated to the desired extent. The pressure thus produced upon the edges causes them to fit snugly within the cavity of the flanges, thereby giving them the shape and exact diameter desired.

As many apparently widely different embodiments of this invention may be made without departing from the spirit thereof, it is to be understood that I do not intend to limit myself to the specific form of embodiment of the invention herein described.

Having thus described my invention what I claim and desire to protect by Letters Patent is:

1. Apparatus for forming a tire casing from a flat pulley band by expanding its central portion and causing its edges to move toward each other, comprising an inflatable tube, a cylinder supporting said tube, side flanges movable toward and away from the central circumferential line of said cylinder, and means for securing said flanges in a position relatively to each other to form with the cylinder a channel for the casing when in tire shape.

2. Apparatus for forming a tire casing from a flat pulley band by expanding its central portion and causing its edges to move toward each other, comprising an inflatable tube, a cylinder supporting said tube, means for positioning the tube upon the cylinder, and means including said positioning means for confining the edges of the casing to prevent outward lateral movement, said confining means being adapted to engage only a portion of the exterior of the casing thereby leaving a portion unconfined to freely respond to the shaping influence of the said tube.

3. Apparatus for forming a tire casing from a flat pulley band by expanding its central portion and causing its edges to move toward each other, comprising an inflatable tube, a cylinder supporting said tube, and means for confining the edges of the casing when in tire shape to prevent outward lateral movement, said confining means being adapted to engage only a portion of the exterior of the casing thereby leaving a portion unconfined to freely respond to the shaping influence of the said tube.

4. Apparatus for forming a tire casing from a flat pulley band by expanding its central portion and causing its edges to move toward each other, comprising an inflatable tube, a cylinder supporting said tube, means for positioning the tube upon the cylinder when in deflated position, and a side gage for positioning the band relative to the tube.

5. Apparatus for forming a tire casing from a flat pulley band by expanding its central portion and causing its edges to move toward each other, comprising an inflatable tube, a cylinder supporting said tube, and side flanges movable toward and away from the tube, said flanges having portions extending inwardly of sufficient width to support the edges of the casing interiorly throughout their entire areas thereby defining the interior diameter of the casing.

6. Apparatus for forming a tire casing from a flat pulley band by expanding its central portion and causing its edges to move toward each other, comprising an inflatable tube, a cylinder supporting said tube, and side flanges movable toward and away from the tube, said flanges having portions extending inwardly underneath the edges of the casing and tapering portions extending inwardly therefrom beyond the edges of the casing to adapt the flanges to be forced between the cylinder and casing to provide a support for the edges of the casing interiorly throughout their entire areas thereby defining the interior diameter of the casing.

7. Apparatus for forming a tire casing from a flat pulley band by expanding its central portion and causing its edges to move toward each other, comprising an inflatable tube, a cylinder supporting said tube, and side rings mounted at predetermined positions upon the cylinder and coöperating therewith to form a channel the width of the tube when deflated and flattened to support same in fixed lateral relation thereto.

8. Apparatus for forming a tire casing from a flat pulley band by expanding its central portion and causing its edges to move toward each other, comprising an inflatable tube, a cylinder supporting said tube, and side rings mounted at predetermined positions upon the cylinder and coöperating therewith to form a channel the width of the tube when deflated and flattened to support same in fixed lateral relation thereto, said rings extending outwardly beyond the said flattened tube to produce a loose fit with the band to permit the band to be freely moved laterally.

9. Apparatus for forming a tire casing from a flat pulley band by expanding its central portion and causing its edges to move toward each other, comprising a cylinder, an inflatable tube supported upon the outer circumference of the cylinder, a side gage for positioning the band relative to the tube, and means for detachably securing the cylinder in fixed relation to the gage.

10. Apparatus for forming a tire casing from a flat pulley band by expanding its central portion and causing its edges to move toward each other, comprising an inflatable tube, a cylinder supporting said tube, a side gage for positioning the band relative to the tube, and means for confining the edges of the casing to prevent outward lateral movement.

11. Apparatus for forming a tire casing from a flat pulley band by expanding its central portion and causing its edges to move toward each other, comprising an inflatable tube, a cylinder supporting said tube, and a side gage for positioning the band relative to the tube.

12. Apparatus for forming a tire casing from a flat pulley band by expanding its central portion and causing its edges to move toward each other, comprising an inflatable tube, a cylinder supporting said tube, means for positioning the tube upon the cylinder, a side gage for positioning the band relative to the tube, and side flanges movable toward and away from each other.

13. Apparatus for forming a tire casing from a flat pulley band by expanding its central portion and causing its edges to move toward each other, comprising an inflatable tube, a cylinder supporting said tube, means for positioning the tube upon the cylinder, and side flanges movable toward and away from each other.

14. Apparatus for forming a tire casing from a flat pulley band by expanding its central portion and causing its edges to move toward each other, comprising an inflatable tube, a cylinder supporting said tube, means for positioning the tube upon the cylinder, side flanges movable toward and away from each other, and means including said positioning means for securing said flanges in operable position.

15. Apparatus for use in forming a tire casing comprising a support for the tire casing adapted to span the edges thereof, means at each edge of the casing mounted on the support and movable transversely relatively thereto for confining the edges of the casing to prevent outward lateral movement, a restricted inflatable tube for independently supporting the casing at a predetermined size from the interior thereof, and means for introducing fluid to the interior of the tube.

16. Apparatus for use in forming a tire casing comprising a restricted inflatable tube for independently supporting the casing at a predetermined size from the interior thereof, means for introducing fluid to the interior of the tube, supporting means comprising a central portion supporting said tube, and end portions for supporting and confining respectively the two edges of the casing to prevent outward relative movement thereof, said portions being fixed against relative movement in their respective planes but capable of transverse movement relative to said central portion.

17. Apparatus for forming a tire casing from a flat pulley band by expanding its central portion and causing its edges to move toward each other, comprising an inflatable tube, and a cylinder for supporting said tube of a width equal at least to the transverse dimension of the tube when in deflated flattened position.

18. Apparatus for forming a tire casing from a flat pulley band by expanding its central portion and causing its edges to move toward each other, comprising a rotatable support, a portable cylinder detachably mounted on the support, and an inflatable tube supported by the cylinder throughout its entire interior area when in deflated flattened position.

Signed at New York, county and State of New York, this 14th day of August 1918.

ERNEST HOPKINSON.